Oct. 21, 1941.   B. F. MOWERS   2,259,828
DRAG HITCH FOR TANDEM DISKS
Filed Sept. 16, 1940

Benjamin F. Mowers
INVENTOR

BY Victor J. Evans & Co.
ATTORNEYS

Patented Oct. 21, 1941

2,259,828

UNITED STATES PATENT OFFICE 2,259,828

DRAG HITCH FOR TANDEM DISKS

Benjamin F. Mowers, Elgin, Ill.

Application September 16, 1940, Serial No. 357,052

1 Claim. (Cl. 55—83)

This invention relates to a drag hitch for a tandem disk and has for an object to provide a hitch which will secure the drag to the rear transverse beam of the tandem disk in such manner that the drag will be maintained in the same position as if it were drawn by animals to better pulverize the earth than were a conventional drag hitch used.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1:
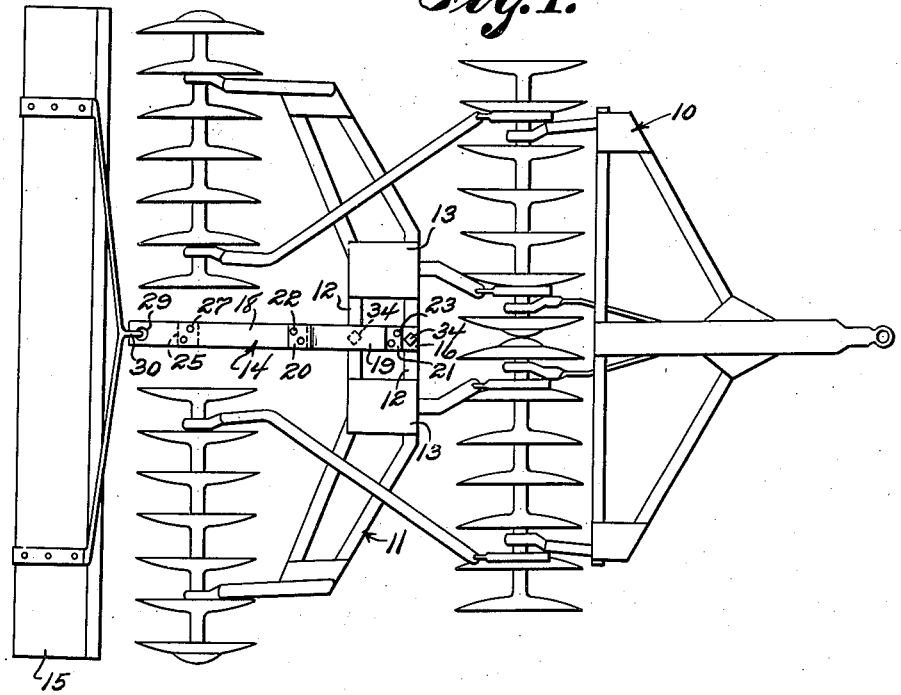
Figure 1 is a plan view of a tandem disk and a drag secured to the rear beam of the disk by a hitch constructed in accordance with the invention.

Referring now to the drawing in which like characters of reference designate similar parts in the various views, 10 designates in general a tandem disk of conventional type having a rear beam 11 which supports the trailing disk structure of the tandem disk. The beam comprises transverse spaced parallel bars 12 connected by longitudinal plates 13 which are spaced apart transversely of the device, and it is to this portion of the beam that my improved hitch 14, for coupling a ground pulverizing drag 15, is secured.

Figure 2:
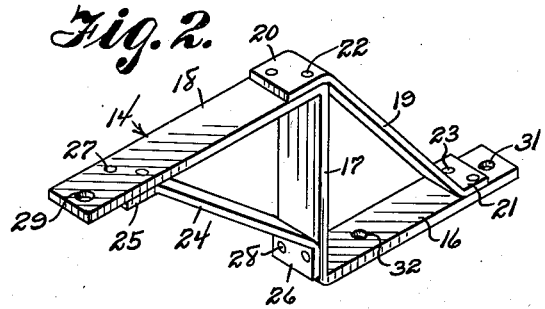
Figure 2 is a perspective view of the drag hitch.

As best shown in Figure 2, the drag hitch is formed of strap metal bent to provide a lower horizontal leg 16, an intermediate vertical leg 17, and an upper horizontal leg 18 extending oppositely to the lower horizontal leg 16. A strap metal inclined brace 19 bridges the angle between the lower horizontal leg 16 and the vertical leg 17 and is provided with upper and lower bent ends 20 and 21 which are riveted, or otherwise secured to the upper horizontal leg and to the lower horizontal leg as shown respectively at 22 and 23. A second inclined strap metal brace 24 bridges the angle between the vertical leg 17 and upper horizontal leg 18 and is provided with respective bent ends 25 and 26 which are riveted, or otherwise secured to the upper horizontal leg 18 and lower end of the vertical leg 17, as shown respectively at 27 and 28.

The upper horizontal leg 18 is provided at the free end with an opening 29 to receive the conventional coupling 30 of the drag 15. The lower horizontal leg 16 is provided at the free end with an opening 31 at the free end and also with an opening 32 disposed near the vertical leg to receive respective securing bolts 33 and 34, which are passed through the transverse parallel bars 12 of the tandem disk rear beam 11, as best shown in Figure 1.

In practice the drag hitch constructed as above-described has been found to support the drag in the same position it would be supported if it were drawn by animals so that the drag more effectively pulverizes the earth than where it is supported as conventionally by a straight link having no offset arms disposed at different elevations as is the case in the present invention.

From the above description it is thought that the construction and operation of the invention will be fully understood without further explanation.

What is claimed is:

The combination with a tandem disk having a rear transverse beam in advance of the trailing disk, and a drag disposed in rear of the rear trailing disk, of a drag hitch comprising, a length of strap metal bent to provide a lower horizontal leg, an intermediate vertical leg, and an upper horizontal leg extending oppositely to the lower horizontal leg, a strap metal inclined brace bridging the angle between the lower horizontal leg and the vertical leg, a second inclined strap metal brace bridging the angle between the vertical leg and the upper horizontal leg, said upper horizontal leg being disposed in a plane above the lower horizontal leg and being connected to said drag, said lower horizontal leg being connected to said transverse beam of the tandem disk.

BENJAMIN F. MOWERS.